United States Patent
Morin (10) Patent No.: US 12,061,949 B2
(45) Date of Patent: Aug. 13, 2024

(54) METHOD, SYSTEM AND APPARATUS EMPLOYING AN ADAPTIVE THRESHOLD TO DECODE BARCODES

(71) Applicant: ZEBRA TECHNOLOGIES CORPORATION, Lincolnshire, IL (US)

(72) Inventor: François Morin, Montreal (CA)

(73) Assignee: Matrox Electronics Systems, Ltd., Lincolnshire, IL (US)

( * ) Notice: Subject to any disclaimer, the term of this patent is extended or adjusted under 35 U.S.C. 154(b) by 0 days.

(21) Appl. No.: 18/202,265

(22) Filed: May 25, 2023

(65) Prior Publication Data

US 2023/0419060 A1  Dec. 28, 2023

Related U.S. Application Data

(60) Provisional application No. 63/356,129, filed on Jun. 28, 2022.

(51) Int. Cl.
G06K 7/10 (2006.01)
G06K 7/14 (2006.01)

(52) U.S. Cl.
CPC ........ G06K 7/10722 (2013.01); G06K 7/1413 (2013.01)

(58) Field of Classification Search
CPC .................. G06K 7/10722; G06K 7/1413

USPC ..................................... 235/462.41
See application file for complete search history.

(56) References Cited

U.S. PATENT DOCUMENTS

| 2005/0103863 A1* | 5/2005 | Zhu ............... G06K 7/10881 235/462.41 |
| 2014/0138442 A1* | 5/2014 | Wang ............... G06K 7/146 235/462.01 |
| 2023/0161989 A1* | 5/2023 | Kim ............... G06T 7/136 235/462.1 |

* cited by examiner

Primary Examiner — Daniel A Hess
(74) Attorney, Agent, or Firm — Yuri Astvatsaturov (57) ABSTRACT

A method for decoding a barcode included in at least one scan line into a string of decoded characters. The method includes for each of at least one barcode character set, establishing a validation threshold based, at least in part, on a degree of difference found among a respective set of reference barcode symbols employed in representing a respective set of reference characters included in the barcode character set with which the respective validation threshold is associated. Each detected barcode symbol is decoded into a decoded character for a corresponding character position in the string using a selected character set. A best-matching symbol is identified for the detected barcode symbol among the respective set of reference barcode symbols of the selected character set. A best-matched character that is represented by the best-matching symbol is validated as the decoded character using the respective validation threshold established for the selected character set.

22 Claims, 5 Drawing Sheets

METHOD, SYSTEM AND APPARATUS EMPLOYING AN ADAPTIVE THRESHOLD TO DECODE BARCODES

BACKGROUND OF INVENTION

1. Field of Invention

This invention relates generally to decoding barcodes. More specifically, at least one embodiment relates to a method, system and apparatus employing an adaptive threshold to decode barcodes.

2. Discussion of Related Art

Today, barcodes are widely used to represent data in a format that can be automatically read by a machine, for example, a barcode reader. Each linear or one-dimensional barcode encodes a string of characters (e.g., alphabetic-only, numeric-only or a combination of alphanumeric characters) as a sequence of bars and spaces of varying widths. Each character is encoded in accordance with a selected barcode standard.

The character encoding scheme represents each character of a predefined character set (or "alphabet") using a different barcode symbol composed of a sequence of bars and spaces (e.g., having a different combination of bar and space widths). Various linear barcode types, standards or "symbologies" exist, such as Code 128, Code 39, EAN UPC, etc. The set of characters that can be encoded, the character encoding scheme (e.g., number of bars and spaces used to represent a character, number of possible widths for a bar or space, etc.) and the organization of information within the barcode (e.g., barcode length, location of control characters, etc.) vary among these standards or symbologies.

The barcode standard establishes the series of adjacent discrete locations available in each barcode symbol. These locations can be referred to as modules. The content of each module is either a bar or an empty space with the selection determined by the character that is represented by the symbol. A single module has a width of one. Where adjacent modules include the same content (bar or space) as one another, the width of that barcode element is greater than the width of a single module. For example, two adjacent bars or two adjacent spaces each have a width of two. As another example, a module that includes a bar where each adjacent module includes a space has a width of one. Each set of contiguous bars or contiguous spaces defines an element of the barcode symbol. Referring again to an example with a bar in a module that is bordered by adjacent modules that include spaces, the bar is a first element, the preceding space or set of contiguous spaces is a second element and the following space or set of contiguous spaces is a third element. Here, the first element has a width of one. The second element has a width determined by the quantity of modules occupied by the contiguous set of spaces included in it. The third element has a width determined by the quantity of modules occupied by the contiguous set of spaces included in it.

To read the barcode, an optical sensor captures one or more scan lines of the barcode and a barcode decoder then analyzes the scan line(s) to detect and decode the barcode and return the decoded string of characters (e.g., in an ASCII format). Various types of optical sensors (which may be stationary or handheld) are employed in barcode decoding systems, such as area-scan cameras, line-scan cameras, laser scanners, etc. In these examples, an area-scan camera captures a two-dimensional image of the barcode; a line-scan camera captures a row of pixels across the barcode; and a laser scanner captures a laser signal or waveform. A barcode decoder detects, in the scan line(s) of the barcode, barcode symbols representing individual characters, decodes each of the detected barcode symbols into a decoded character, and returns the sequence of decoded characters as the decoded string.

Conventional decoding of a detected barcode symbol employs a matching step and a validation step. The matching step is performed by comparing the widths of elements included in the detected barcode symbol with the widths of elements included in each of the "reference" symbols that represent the characters included in the character set, respectively, to identify a match. To reduce the likelihood of a false match, the validation step operates to validate the match by comparison against a threshold.

At the matching step, the barcode decoder compares the measured width values of the detected barcode symbol and the reference width values representing each reference character included in the character set, respectively. For each character in the character set, the comparison produces a difference measure determined as a difference of the measured width values and the reference width values for the respective character in the character set. The best matching character is identified as the character in the character set that corresponds to the smallest value of the difference measure.

To avoid an error created by a false match, the barcode decoder then compares the value of the difference measure for the detected barcode symbol and best-matched character with a validation threshold. For example, the barcode decoder validates the match if the value of the difference measure is below the threshold and rejects the match otherwise. The value of the validation threshold effectively determines the degree of difference the barcode decoder will tolerate between a detected barcode symbol and a matched reference symbol of a reference character of the character set for the match to be validated.

However, current approaches employ a single fixed validation threshold for different character sets. This approach is often too restrictive. For example, scanned barcodes can include various deformations. The barcode itself may be "off spec", improperly printed, or degraded in some way. Also, the scans or images of the barcode may be of poor quality (e.g., low contrast, lens and perspective distortion, etc.). The restrictive validation thresholds often do not provide enough tolerance for deformation in the scanned barcode. In some cases, although the barcode decoder matches a deformed barcode symbol to the correct reference character, it does not validate the match because the difference between the deformed barcode symbol and best-matched character exceeds the restrictive validation threshold. One result is that a barcode decoder can fail to decode an entire barcode because it failed to validate a matched "start" character indicating the start of the barcode.

As an alternative, a more permissive validation threshold can be selected. While the more permissive validation threshold is more tolerant of deformed barcode symbols, this may increase the chance of a false match, for example, in the case where the character set includes reference characters with similar reference symbols. In this case, the barcode decoder may mismatch a detected barcode symbol for a similar reference character (symbol) and, due to the permissive validation threshold, validate the mismatched character resulting in an incorrectly decoded character.

SUMMARY OF INVENTION

Therefore, there is a need for methods, systems and apparatus that employ an adaptive validation threshold to determine whether a detected barcode symbol is correctly decoded in a barcode decoding process. According to various embodiments, the validation threshold is dependent on the character set that is being employed in the barcode decoding process. In general, the character set is determined based on a barcode standard or symbology employed in encoding the barcode. According to some embodiments, the validation threshold is individually determined for each barcode character set based, at least in part, on a degree of difference found between reference barcode symbols included in the set of reference barcode symbols of the respective barcode character set.

According to some embodiments, different character sets may be associated with different character positions in a barcode string to be decoded. Here, a different validation threshold is employed for each of the different characters sets that are employed in decoding the barcode. For example, a decoder for a particular barcode standard can employ two different character sets where a first character position in a barcode string is associated with a first character set and the other character positions in the barcode string are associated with a second character set. According to these embodiments, a first validation threshold for the first character set is employed to validate characters matched for the first character position and a second validation threshold for the second character set is employed to validate characters matched for the other character positions in the barcode string.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1:
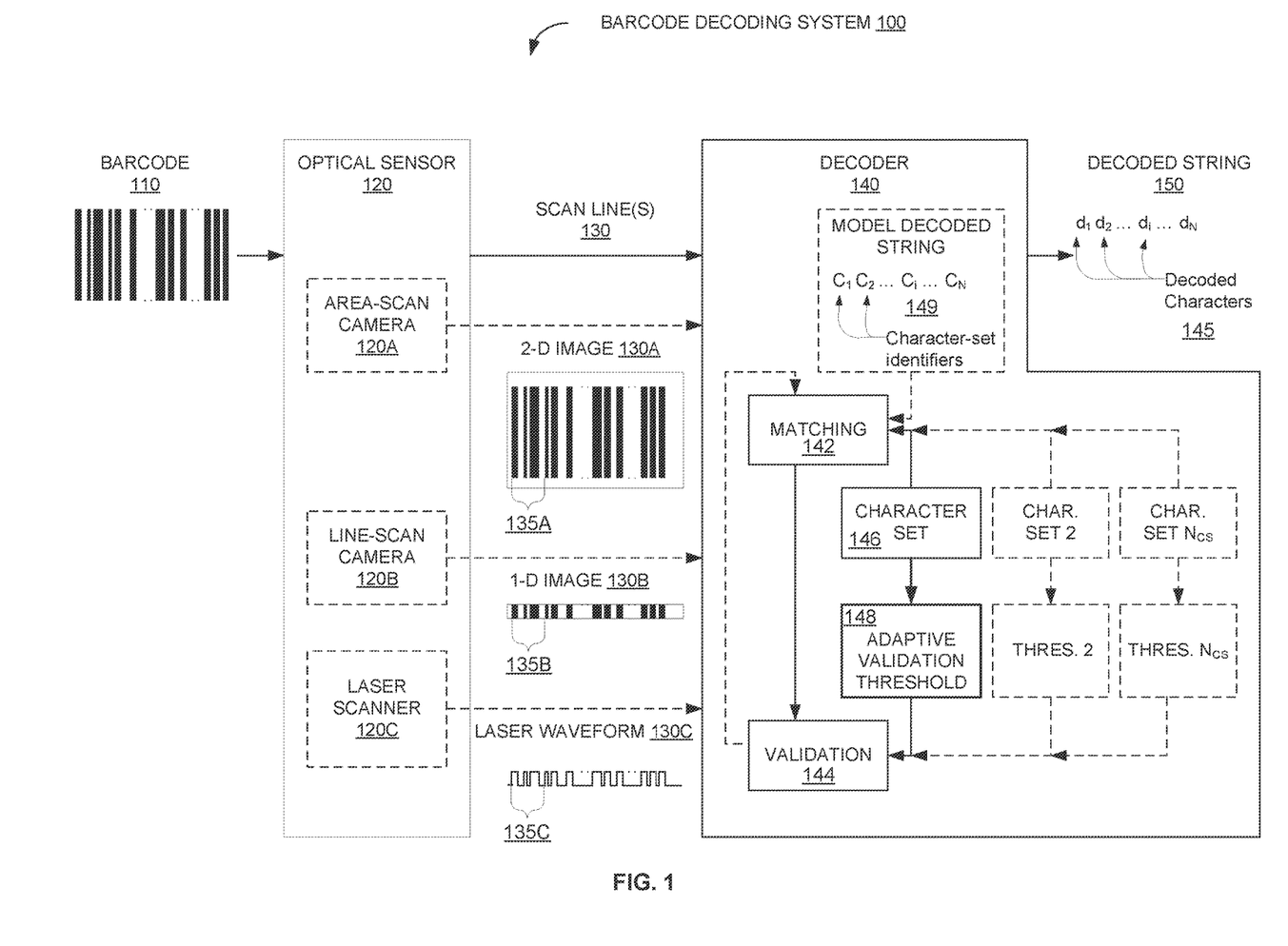
FIG. 1 illustrates a system for barcode decoding in accordance with one embodiment.

Referring now to FIG. 1, a barcode decoding system 100 is illustrated in accordance with one embodiment. In various embodiments, the barcode decoding system 100 operates to decode a barcode 110 into a decoded string 150. According to the illustrated embodiment, the barcode decoding system 100 includes a barcode 110, an optical sensor 120, one or more scan line(s) 130, a decoder 140 and a decoded string 150.

In various embodiments, the barcode 110 consists of (or includes) a linear or one-dimensional barcode that encodes a string of characters (e.g., alphabetic-only, numeric-only or a combination of alphanumeric characters) as a sequence of bars and spaces of varying widths. The barcode 110 is encoded according to any of a number of barcode standards or symbologies including, but not limited to, Code 128, Code 39 and EAN UPC. Accordingly, the set of characters that can be encoded in the barcode 110, the character encoding scheme (e.g., number of bars and spaces used to represent a character, number of possible widths for a bar or space, etc.) used to encode the barcode and the organization of information within the barcode vary from one embodiment to another depending on the particular symbology of the barcode.

The optical sensor 120 captures one or more scan lines 130 of the barcode 110 for processing by the decoder 140. According to various embodiments, the optical sensor 120 can include an area-scan camera 120A, a line-scan camera 120B, a laser scanner 120C, a video camera (not shown) or another optical sensor device suitable for digitizing a barcode for processing by the decoder 140. Where the area-scan camera 120A is employed, the optical sensor 120 captures a two-dimensional image 130A of the barcode 110. Where the line-scan camera 120B is employed, the optical sensor 120 captures a row of pixels (or one-dimensional image) 130B across the barcode 110. Where the laser scanner 120C is employed, the optical sensor 120 captures a laser signal or waveform 130C of the barcode 110. Each of the preceding optical sensors 120A, 120B, 120C can be stationary or handheld depending upon the embodiment.

In general, the decoder 140 processes the scan line(s) 130 to detect and decode the barcode returning the decoded string of characters 150 (e.g., in an ASCII format). For example, the decoder 140 detects, in the scan line(s) 130, barcode symbols 135 (e.g., 135A, 135B or 135C) representing individual characters, decodes each of the detected barcode symbols 135 into a decoded character 145, and returns the sequence of decoded characters 145 as the decoded string 150. According to the illustrated embodiment, the decoder 140 includes a matching module 142, a validation module 144, at least one character set 146, at least one validation threshold 148, and optionally, one or more model decoded strings 149.

The matching module 142 determines, for each of the detected barcode symbols 135 included in the scan line(s) 130, a best-matching reference symbol and corresponding reference character in a selected character set. The matching module 142 operates by determining a difference measure between the detected barcode symbol and the reference symbol of each of the reference characters included in the selected character set and then identifying the reference symbol and corresponding reference character having a minimum difference as the best-matching reference symbol and corresponding best-matching reference character.

Depending on the embodiment, the matching module 142 can employ any of a variety of pattern matching techniques and difference measures. For each detected barcode symbol 135, the pattern matching is performed with the reference barcode symbol of each reference character in the character set to determine the best match. These pattern matching techniques can compare, using a difference measure, a set of width values extracted from the detected barcode symbol (e.g., widths of bar and space elements forming the detected barcode symbol) with a corresponding reference set of width values representing or extracted from the reference barcode symbol. The pattern matching technique can compare values of pixels (e.g., pixel intensities) in the detected barcode symbol with values of pixels in a reference barcode symbol image using normalized grayscale correlation, for example. The pattern matching technique can extract a set of features from the detected barcode symbol and determine associations between the extracted set of features and a reference set of features representing or extracted from the reference barcode symbol. For example, the set of features can be the coordinates of edge points, interest points or other local features. Pattern matching techniques based on geometric hashing, the Hough transform, or generalized Hough transform may be employed, as just some examples.

The validation module 144 employs a validation threshold to evaluate a result of a match by comparing the minimum difference of the best-matching reference symbol with the validation threshold established for the selected character set. A successful decoding occurs with the identification of a match of the scanned barcode symbol with a reference symbol associated with the selected character set and then a validation of the identified match using the validation threshold established for the selected character set. Various approaches to establish the validation threshold can be employed as described in further detail below.

The at least one character set 146 provides the reference barcode symbols and associated reference characters employed for a given barcode standard. According to one embodiment, the at least one character set 146 includes a single character set (e.g., the full set of characters supported by the symbology). According to other embodiments, the at least one character set 146 includes a plurality of character sets, for example, character set 1 through character set N. Each of the character set(s) 146 includes a set of one or more reference characters, each associated with a reference barcode symbol.

The at least one validation threshold 148 provides a threshold employed to evaluate the results of the barcode symbol matching for an associated character set included in the at least one character set 146. For example, each of the at least one character set(s) 146 includes a corresponding validation threshold 148. Each of the validation threshold(s) 148 is determined based on the character set 146 with which it is associated. This provides an adaptive approach that can significantly improve the performance of the decoder 140 as compared with prior approaches, which employed a single fixed validation threshold for different character sets.

The validation threshold 148 associated with the selected character set 146 is employed to evaluate the results of matching for the selected character set to eliminate or reduce errors that might otherwise occur in the decoding. According to some embodiments, the validation threshold depends on a degree of difference between the reference symbols of reference characters included in the character set (which affects the likelihood of a mismatch). A more permissive validation threshold can be employed where there is a larger degree of difference between the reference symbols (and therefore a smaller likelihood that a detected barcode symbol is mismatched to a similar reference symbol). A more restrictive validation threshold can be employed where there is a smaller degree of difference between the reference symbols (and therefore an increased likelihood that the detected barcode symbol is mismatched to a similar reference symbol). In various embodiments, the adaptive validation threshold is increased to improve a tolerance of the barcode decoder to deformations in cases where the degree of difference between reference symbols of the character set is large enough. These approaches are effective in maintaining the robustness of the barcode decoding process to mismatches.

In some embodiments, the validation threshold is determined by determining a value of a difference measure between pairs (e.g., each pair) of reference symbols of the character set to obtain a set of difference measure values for the character set and then determining the validation threshold based on the set of difference measure values. In some embodiments, the validation threshold may be determined as a function of the smallest difference measure value of the set (which measures the distance between the closest reference points in the feature space). For example, the validation threshold may be determined as half of the smallest difference measure value (the midpoint between the two closest reference points in the feature space).

In some embodiments, the difference measure used to compare a pair of reference symbols of the character set to determine the validation threshold is the same difference measure as is used to compare a detected barcode symbol with a reference symbol for matching. According to these embodiments, the likelihood of confusing two reference symbols of the character set better represents the likelihood of mismatching a detected barcode symbol as one of these reference symbols rather than the other during matching.

In some embodiments, the difference measure used to compare a pair of symbols is a cumulative difference measure that accumulates difference values over multiple elements to measure multiple degrees of difference and better discriminate between symbols. During matching, this reduces the chance of a barcode symbol being mismatched. During validation, a larger measured difference between reference symbols means a more permissive validation threshold can be selected to increase the tolerance of the barcode decoder. In some embodiments, each symbol is represented by a set of width values forming a width vector and the difference measure between a pair of symbols is determined by accumulating the pairwise difference values between corresponding width values in their width vectors.

In some embodiments, a model decoded string 149 is provided. The model decoded string 149 identifies, for each character position in a string to be decoded, the set of valid reference characters for that character position (a character set for that character position). Generally, the character set for a character position establishes the character set and associated reference barcode symbols employed for decoding a character at that character position. Generally, the character set for a character position is a subset of a larger character set (such as the full set of characters supported by the barcode symbology). Depending on the embodiment, the character set for a character position can include one reference character, multiple reference characters or all reference characters included in the larger character set. Further, a same character set (same set of valid characters) can be associated with multiple character positions in the model decoded string.

In various embodiments, multiple character sets are defined (for example, the at least one character set 146 can include a plurality of character sets as illustrated in phantom in FIG. 1). According to one embodiment, each of the plurality of character sets is uniquely identified, for example, using an index. A model decoded string then provides, for each character position, a character set identifier identifying the character set for that character position, for example, using the index. Referring to FIG. 1, character set identifier Ci identifies which of the character sets applies at character position i in the model decoded string 149. For example, a first defined character set CS1: (0-9) includes only digits as characters. A second defined character set CS2: (A-Z) includes only letters as characters. According to this example, a model decoded string M=[CS1, CS1, CS2, CS2] identifies the respective character positions for which the two defined character sets provide valid characters. In this example, the model decoded string provides for numeric values (first defined character set CS1) in the two leftmost character positions and for alpha characters (second defined character set CS2) in the two rightmost character positions.

In some embodiments, the model decoded string 149 is based on the expected format of the barcode according to the barcode symbology that establishes the character set and associated reference barcode symbols. For example, a Code 128 barcode begins with a start code that is followed by data characters. In this example, two defined character sets are employed: a first defined character set CS1: (start characters only) includes only start characters and a second defined character set CS2: (data characters only) includes only data characters. In this example, the resulting model decoded string for a Code 128 barcode is M=[CS1, CS2, CS2, CS2 . . . ] which provides for a start code (first defined character set CS1) in the leftmost character position and for data characters (second defined character set CS2) in the other character positions.

In some embodiments, the model decoded string 149 may be based on the expected format of a decoded string for a particular application and/or provided by a user. For example, an application or user may employ a particular format for serial numbers that are encoded in the barcodes. In this case, the character set for a selected character position in the model decoded string may be a subset of the characters supported by the symbology (e.g., a subset of the entire character set or, where applicable, a subset of the characters the symbology specifies for that character position) that includes only the set of valid characters at that character position according to the particular serial number format.

Where a model decoded string is employed to decode a barcode, a decoded string must satisfy the model decoded string to be valid. That is, each decoded character of the decoded string must belong to the set of valid characters (character set) for the respective character position of the model decoded string.

In operation, the decoder 140 receives the scan line(s) 130 of the barcode 110 output by the optical sensor 120. The decoder 140 processes the scan line(s) 130 to decode the barcode and return a decoded string of characters 150. The decoder 140 detects barcode symbols 135 in the scan line(s) 130 and decodes each of the detected barcode symbols 135 into a decoded character 145. The decoder 140 employs one or more character sets selected from among the at least one character set 146 (selected based on the barcode standard employed to represent the information included in the barcode and/or based on a model decoded string, for example). The matching module 142 identifies, for each scanned barcode symbol, a reference barcode symbol associated with the selected character set that best matches the scanned barcode symbol. In various embodiments, the validation module 144 operates to compare the difference between the scanned barcode symbol and the best-matching reference barcode symbol with the validation threshold established for the selected character set. Where the difference is within the validation threshold, the match is validated and the scanned barcode symbol is successfully decoded. Where the difference is outside the validation threshold, the match is rejected.

Figure 2:
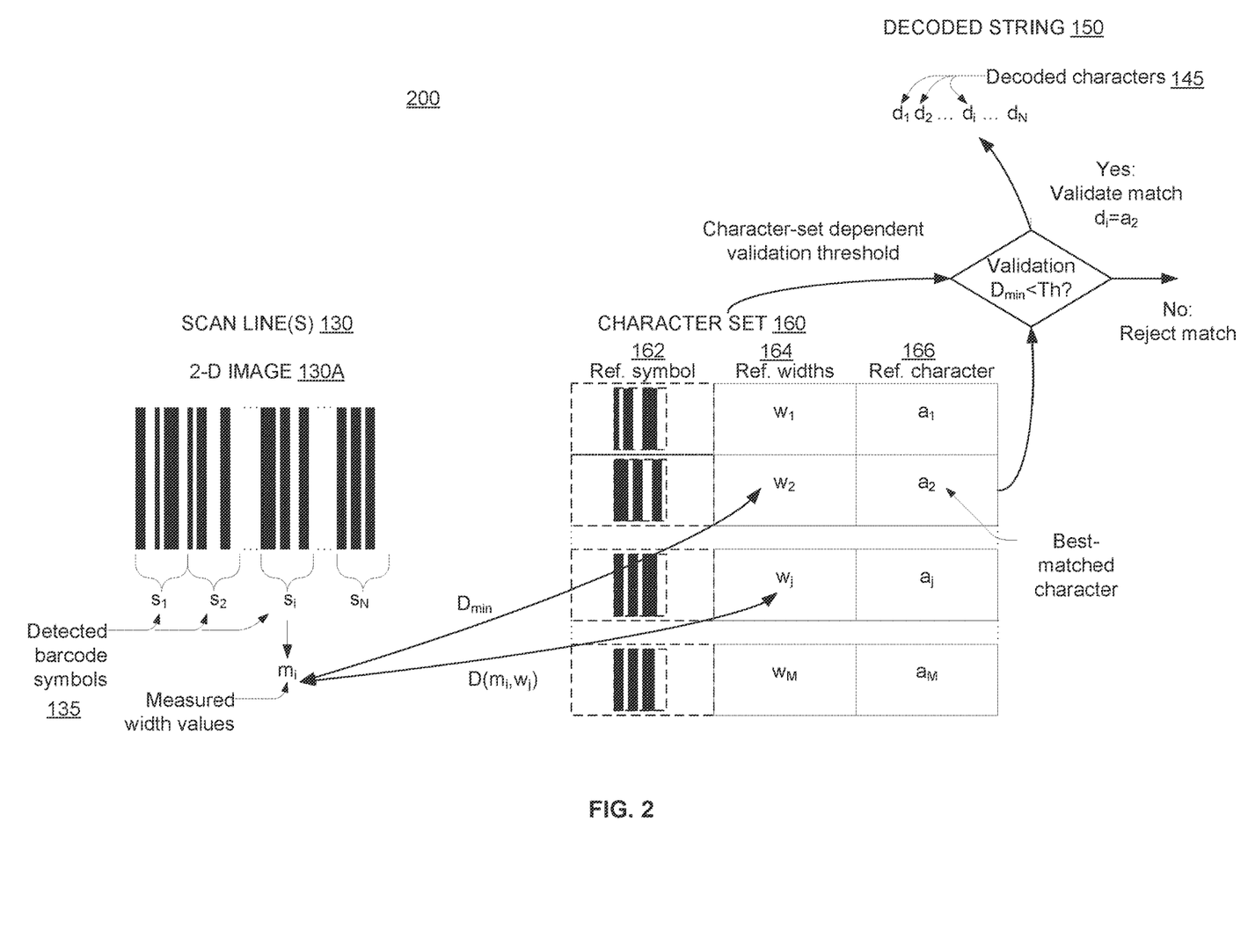
FIG. 2 illustrates a conceptual process flow diagram for decoding a barcode symbol in accordance with one embodiment.

Referring now to FIG. 2, a conceptual process flow diagram is illustrated in accordance with a process 200 in which a detected barcode symbol is matched based on reference barcode symbols associated with a selected character set and the match validated using a validation threshold that depends on the selected character set. The process 200 includes scan line(s) 130 included in the 2-D image 130A of a bar code (for example, barcode 110), the character set 160 employed for barcode symbol matching and the validation process 168 employed to validate matched barcode symbols. The process operates to provide a decoded character 145 of the decoded string 150 as an output. The 2D image 130A includes a plurality of detected barcode symbols $s_1$-$s_N$. The character set 160 includes a set of reference barcode symbols 162, a set of reference width vectors 164, for example, the reference width vectors $w_1$-$w_M$ and a set of reference characters 166, for example, the reference characters $a_1$-$a_M$. The character set 160 associates each of the reference barcode symbols 162 having an associated reference width vector 164 with a corresponding reference character from the set of reference characters 166. In some embodiments, the character set 160 includes only the set of reference width vectors 164 and the set of reference characters 166; the set of reference barcode symbols 162 (shown in phantom) that are represented by the set of reference width vectors 164 are not included.

According to the illustrated embodiment, the process 200 operates using a difference measure D established based on the width vectors determined for the subject pair of barcode symbols. This includes the width vector of one of the detected barcode symbols, for example, the measured width vector $m_i$ of the detected barcode symbol $s_i$, and the width vector of one of the reference barcode symbols (i.e., one of the reference widths $w_1$-$w_M$), for example, the reference width vector $w_j$ for reference character $a_j$. The overall matching process operates by, for each of the detected barcode symbols $s_1$-$s_N$, determining a minimum difference $D_{min}$ between the measured width vector extracted from the detected barcode symbol and the reference widths established for the reference symbols associated with the selected character set 160. According to the illustrated embodiment, a measured width vector $m_i$ for a detected barcode symbol $s_i$ is compared to each of the reference widths $w_1$-$w_M$, for example, establishing a set of difference values including $D(m_i, w_j)$. This comparison results in a determination of a minimum difference $D_{min}$ determined across the set of difference values. The reference character associated with the reference symbol having the minimum difference (here, reference character $a_2$) is identified as the best-matched character.

However, to successfully decode the detected barcode symbol $s_i$, the validation process 168 is performed to validate the match. According to the illustrated embodiment, the validation process 168 includes a comparison of the minimum difference $D_{min}$ with a validation threshold Th. The validation threshold Th is dependent on the character set 160 employed for matching (as shown by the arrow). According to this embodiment, the match is validated when the minimum difference $D_{min}$ is less than the threshold. For example, a successful validation results in the best-matched reference character $a_2$ being the decoded character $d_i$.

In the example illustrated in FIG. 2, the validation process 168 is performed for each of the detected barcode symbols $s_1$-$s_N$ to determine the decoded characters $d_1$-$d_N$, for example, the reference character $a_2$ is the decoded character $d_i$ for the $i^{th}$ character position in the decoded character string 150. Where the minimum difference $D_{min}$ is outside the validation threshold (e.g., larger than or equal to the threshold in the illustrated embodiment), the best-matched reference character is rejected as a match. As is described in further detail below, the decoding process continues by either restarting the decoding on the same scan line, moving to the next scan line, or if there are no additional scan lines, failing to decode the barcode 110.

Figure 3A:
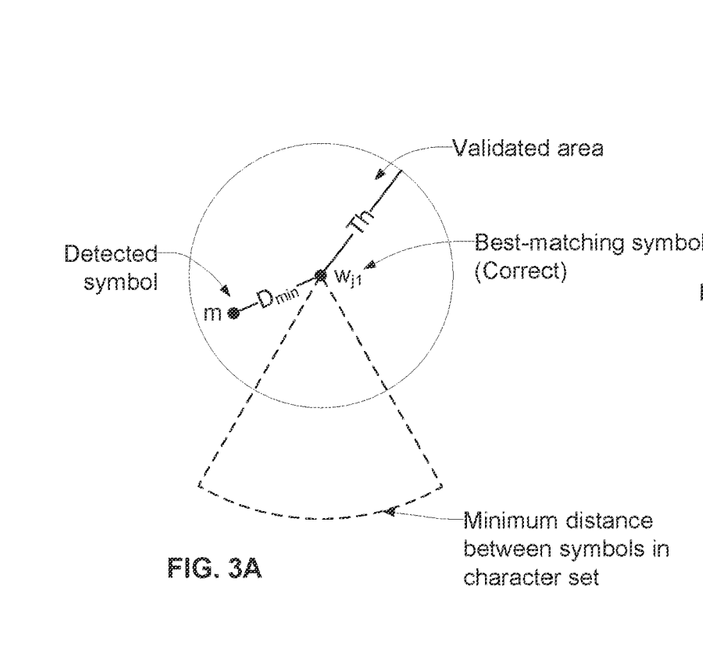
FIGS. 3A and 3B illustrate an adaptive validation threshold in accordance with one embodiment.
Figure 3B:
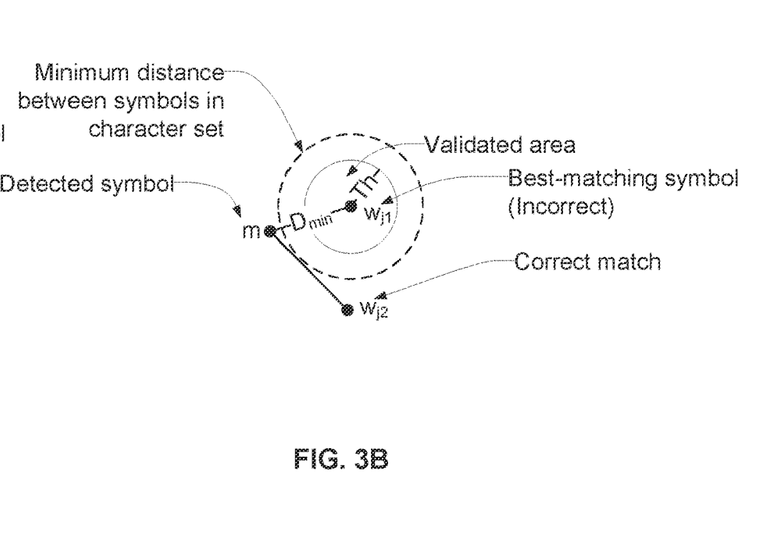

Referring now to FIGS. 3A and 3B, two examples of a validation process employing a validation threshold that is dependent on the character set are illustrated in accordance with one embodiment. These examples illustrate a relative difference between a minimum distance between symbols in a character set and a corresponding validation threshold employed to validate the match of detected barcode symbols to a reference barcode symbol included in a set of reference barcode symbols 162 in the character set. In various embodiments, the operations illustrated in FIGS. 3A and 3B can be performed by the validation module 144 included in the decoder 140 as illustrated in FIG. 2. For purposes of describing the validation processes illustrated in FIGS. 3A and 3B, the difference measure used to compare a pair of reference symbols of the character set to determine the validation threshold is the same difference measure as is used to compare a detected barcode symbol with a reference symbol for matching. According to one embodiment, the difference measure employed to identify the best-matching character is determined based on a value of a width vector of the respective symbols.

In each example, a minimum distance between symbols in the character set is determined. According to the illustrated embodiment, a validation threshold Th is established where the validation threshold has a value that is less than the minimum distance between symbols in the character set. The value Th established for the validation threshold can be determined using various approaches depending on the embodiment. According to one embodiment, the validation threshold has a value that is one half the value of the minimum distance between symbols in the character set.

In the illustrated embodiment, the difference measure employed to identify the best-matching character is determined based on a value of a width vector of the respective barcode symbols. In FIG. 3A, the detected barcode symbol having a measured width vector m has a minimum difference measure with a reference barcode symbol having a width vector $w_{j1}$. A value of the resulting difference measure $D_{min}$ is illustrated graphically as a distance separating the detected barcode symbol m and the best-matching reference barcode symbol $w_{j1}$. In FIG. 3A, the difference measure $D_{min}$ is within the validated area established by the validation threshold Th. The process can be completed by the decoder 140 including identifying a best-matching symbol using the matching module 142 and validating the match using the validation module 144. The validation results in the reference character associated with the best-matching symbol being included as a decoded character in the decoded character string. In this example, a larger minimum distance between symbols in the character set resulted in a larger validation threshold (larger validated area) that allowed the match to be validated and the symbol to be successfully decoded. Had a smaller, fixed validation threshold been used, the match may not have been validated.

In contrast, FIG. 3B illustrates a case in which the best-matching reference barcode symbol $w_{j1}$ and the detected barcode symbol m have a minimum difference measure $D_{min}$ that is outside the validation threshold Th. Here, the process has not identified the correct match $w_{j2}$ but has avoided incorrectly decoding the detected barcode symbol m as the best-matching symbol $w_{j1}$. In this example, a smaller minimum distance between symbols in the character set resulted in a smaller validation threshold (smaller validated area) that avoided an incorrectly matched symbol being validated and the symbol being incorrectly decoded. Had a larger, fixed validation threshold been used, the incorrect match may have been validated and the symbol incorrectly decoded. As is described in further detail below, the process illustrated in FIG. 3B can result in the decoding process restarting at a first character position in the string for the next candidate barcode element on the same scan line, moving to the next scan line, or if there are no additional scan lines, failing to decode the barcode.

Figure 4:
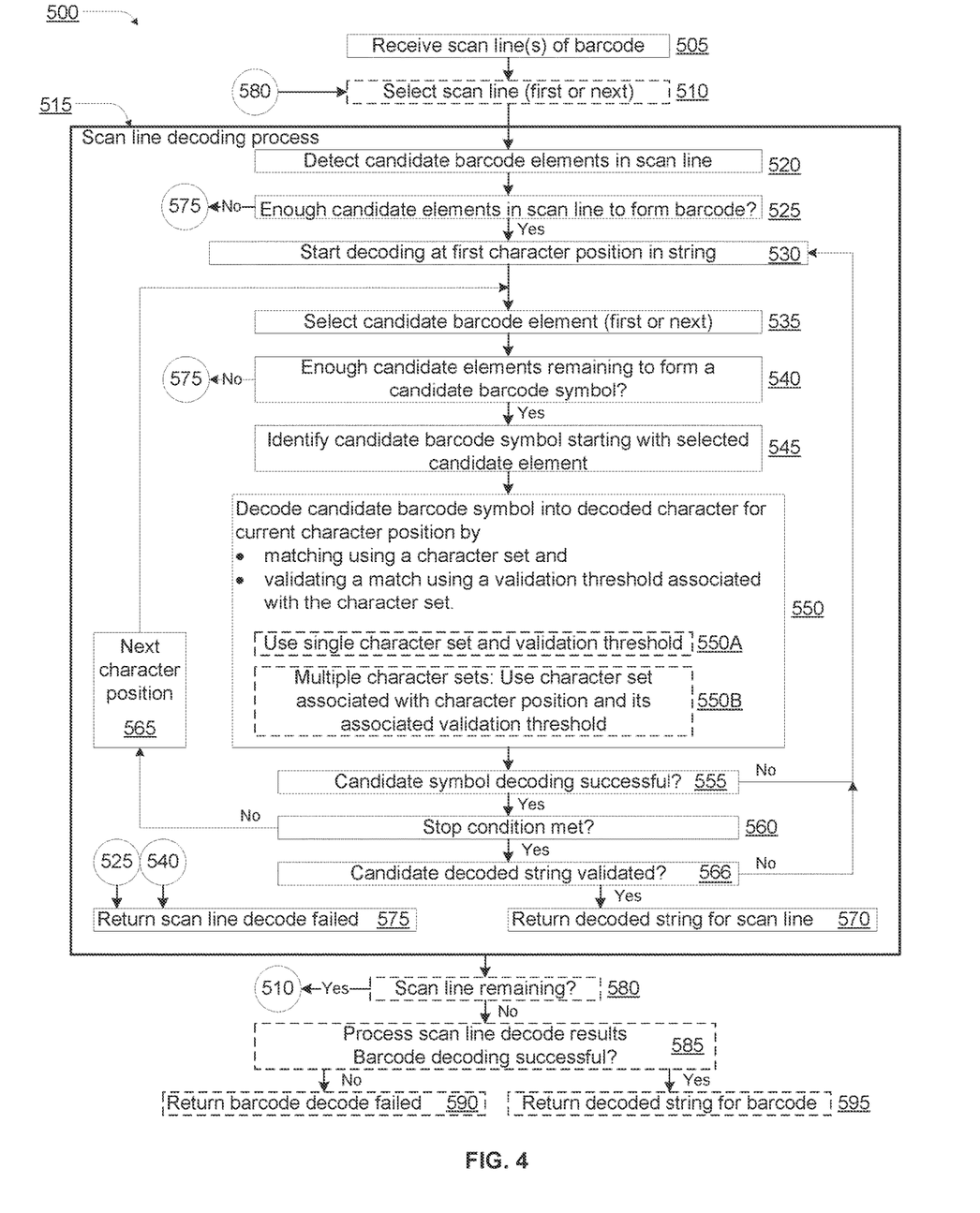
FIG. 4 illustrates a process flow diagram of a barcode decoding process in accordance with one embodiment.

Referring now to FIG. 4, a flow diagram of a process 500 for barcode decoding is illustrated in accordance with one embodiment. In general, the process 500 employs a matching operation and a validation operation where the validation operation employs an adaptive threshold associated with the character set used for matching, such as a threshold that is determined based on the character set defined by the barcode symbology of the barcode or a subset of this character set defined by a user. As described in detail below, the overall process 500 includes a series of operations performed on each scan line that is received by the decoder 140.

In various embodiments, the process 500 includes actions and decision points. According to the illustrated embodiments, the actions include an act of receiving scan line(s) of a barcode 505, an act of selecting a scan line for decoding 510, a set of acts included in a scan line decoding process 515, an act of returning a barcode decode fail 590 and an act of returning a decoded string for the barcode 595. The process 500 includes decision points including an act of determining whether there is a scan line remaining 580 and an act of processing the results of the scan line decoding and determining whether there is a successful decoding of the barcode 585.

The scan line decoding process 515 includes an act of detecting candidate barcode elements in a scan line 520, an act of starting decoding at a first character position in a model decoded string 530, an act of selecting a candidate barcode element 535, an act of identifying a candidate barcode symbol starting with a selected candidate element 545, a set of acts included in a candidate barcode symbol decoding process 550, an act of moving to the next character position in the string 565, an act of returning a decoded string for a scan line 570 and an act of returning a scan line decode failure 575. The scan line decoding process 515 also includes decision points including an act of determining whether enough candidate elements are in the scan line to form a barcode 525, an act of determining whether enough candidate elements are remaining to form a candidate barcode symbol 540, an act of determining whether decoding of a candidate symbol is successful 555, an act of determining whether a stop condition is met 560 and an act of determining whether a candidate decoded string is validated 566. The candidate barcode symbol decoding process 550 includes an act of using a single character set and validation threshold 550A and/or an act of using a character set associated with a character position and its associated validation threshold 550B.

According to the illustrated embodiment, the process 500 starts at the act of receiving scan line(s) of a barcode 505. In various embodiments, the scan line(s) are captured by the optical sensor 120 employed to scan the barcode 110. The barcode decoding process 500 generally includes capturing multiple scan lines. At the act of selecting a scan line for decoding 510, the process 500 operates to identify a scan line for decoding among the scan line(s) received at the act 505, such as a first scan line or a next scan line. The process 500 moves to the scan line decoding process 515 beginning with the act of detecting candidate barcode elements in the selected scan line 520, such as candidate bars or spaces. Here, the process can detect transitions (between the foreground and background) or edges and then identify the areas between these transitions or edges as the barcode elements, alternately a bar element and a space element. The scan line decoding process 515 operates to determine whether the quantity of candidate elements identified at the act 520 is sufficient to form a barcode at the act of determining whether enough candidate elements are in the scan line to form a barcode 525. Here, for example, the process can determine a minimum number of elements in the barcode by multiplying (1) the minimum number of characters encoded by the barcode (e.g., as defined by the symbology or provided by the user) or a number of characters in the model decoded string with (2) the number of elements per barcode symbol according to the symbology. If there are too few candidate elements, the scan line decoding process 515 moves to the act of returning a scan line decode failure 575 indicating that decoding of the scan line was unsuccessful. If enough candidate elements exist, the process moves to the act of starting decoding at a first character position in the model decoded string 530.

At the act of selecting a candidate barcode element 535, the scan line decoding process 515 identifies a specific candidate barcode element in the scan line, such as the first barcode element or a next barcode element of the scan line. The process moves to the act of determining whether enough candidate elements are remaining to form a candidate barcode symbol 540. For example, for decoding a barcode in a symbology where a barcode symbol includes 6 elements including 3 bars and 3 spaces (e.g., a Code128 barcode), the process determines whether there are at least 6 candidate elements remaining in the scan line. If there are too few candidate elements remaining, the scan line decoding process 515 moves to the act of returning a scan line decode failure 575. If enough candidate elements remain, the process moves to the act of identifying a candidate barcode symbol starting with the selected candidate element 545 (e.g., having as its left-most element the selected candidate element).

The scan line decoding process 515 moves to the act of decoding the candidate barcode symbol into a decoded character 550. This act is performed for each character position (via the act 565 of moving to the next character position in the string) and includes both a matching process and a validation process, for example, as illustrated and described with reference to FIGS. 1, 2, 3A and 3B. The matching is performed using a selected character set. The validation process to confirm an accuracy of the match is performed using a validation threshold established for the selected character set. According to some embodiments, the scan line decoding process 515 is performed using the same character set and validation threshold for each character position included in the model decoded string, represented here at the act 550A. According to other embodiments, the scan line decoding process 515 is performed using multiple character sets with a separate validation threshold associated with each of the respective character sets, represented here at the act 550B. In some embodiments, different character sets are associated with different character positions in the model decoded string. In these embodiments, the decoding for a specific character position is performed using the character set associated with that character position (for matching) and its associated validation threshold (for validation).

The scan line decoding process 515 moves to the act of determining whether decoding of the candidate barcode symbol is successful 555. If not, the scan line decoding process 515 returns to the act of starting decoding at the first character position in the model decoded string 530 and from there moves to the act of selecting a candidate barcode element 535. Where the candidate barcode symbol is matched and the match successfully validated, the scan line decoding process 515 moves to the act of determining whether a stop condition is met 560. For example, a stop condition can indicate that all characters in the string are processed and successfully decoded. If the stop condition is not met (e.g., all characters in the string are not yet decoded), the scan line decoding process 515 moves to the act of moving to the next character position in the string 565 and from there returns to the act of selecting a candidate barcode element 535. If the stop condition is met, the scan line decoding process 515 moves to the act of determining whether the candidate decoded string is validated 566. If it is not, the process returns to the act of starting decoding at a first character position in the model decoded string 530. If the candidate decoded string is validated, the scan line decoding process 515 is completed with the act of returning a decoded string for the scan line 570.

The scan line decoding process 515 included within the overall barcode decoding process 500 is completed following either the act of returning a decoded string for the scan line 570 or the act of returning a scan line decode fail 575. In each case, the process 500 moves from the scan line decoding process 515 to the act of determining whether any scan lines remain for processing 580. If scan lines still remain, the process 500 returns to the act of selecting a scan line for processing 510. If there are no further scan lines remaining, the process 500 moves to the act of determining whether the barcode is successfully decoded 585. Here, the scan line decode results are processed, for example, to determine whether the scan line decoding process 515 returned a decoded string for any of the scan lines. If at act 585 it is determined that the barcode is not successfully decoded (e.g., the scan line decoding did not return a decoded string for any of the scan lines), the process 500 moves to the act of returning a barcode decode failed message 590. If the barcode decode is successful (e.g., the scan line decoding returned a decoded string for at least one of the scan lines), the process 500 moves to the act of returning a decoded string for the barcode 595.

Figure 5:
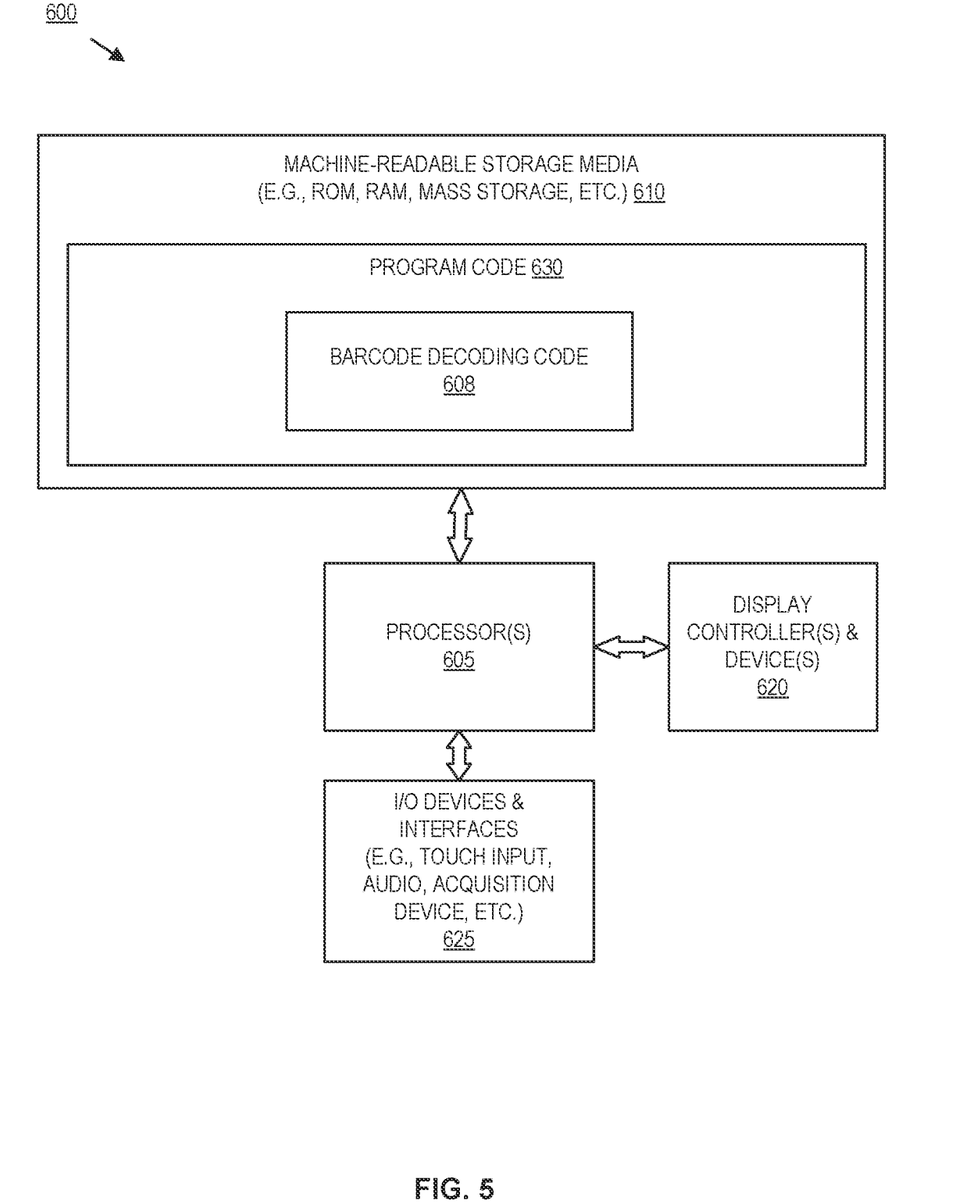
FIG. 5 illustrates a block diagram illustrating a data processing system that may be used in accordance with some embodiments.

FIG. 5 illustrates a block diagram for an exemplary data processing system 600 that may be used in some embodiments. Data processing system 600 includes one or more processors 605 and connected system components (e.g., multiple connected chips). Alternatively, the data processing system 600 is a system on a chip or Field-Programmable gate array. One or more such data processing systems 600 may be utilized to implement the functionality of the decoder 140 and related processes as illustrated and described with reference to FIGS. 1-4.

The data processing system 600 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 605. For example, the depicted machine readable storage media 610 may store program code 630 that, when executed by the processor(s) 605, causes the data processing system 600 to perform barcode decoding. For example, the program code 630 may include barcode decoding code 608, which when executed by the processor(s) 605, causes the data processing system 600 to perform the operations described with reference to FIGS. 1-4.

According to these embodiments, an electronic device (e.g., a computer or an FPGA) includes hardware and software, such as a set of one or more processors coupled to one or more machine-readable storage media to store code for execution on the set of processors and/or to store data. For example, an electronic device may include non-volatile memory containing the code since the non-volatile memory can persist the code even when the electronic device is turned off. While the electronic device is turned on the part of the code that is to be executed by the processor(s) of the electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The data processing system 600 may also include a display controller and display device 620 to provide a visual user interface for the user, e.g., GUI elements or windows. The visual user interface may be used to enable a user to input parameters to the decoder 140 for barcode decoding using an adaptive threshold, or any other task.

The data processing system 600 also includes one or more input or output ("I/O") devices and interfaces 625, which are provided to allow a user to provide input to, receive output from, and otherwise transfer data to and from the system. These I/O devices 625 may include a mouse, keypad, keyboard, a touch panel or a multi-touch input panel, camera, frame grabber, optical scanner, an audio input/output subsystem (which may include a microphone and/or a speaker for, for example, playing back music or other audio, receiving voice instructions to be executed by the processor(s) 605, playing audio notifications, etc.), other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and can provide inputs derived from those touches to the processing system 600.

The I/O devices and interfaces 625 may also include a connector for a dock or a connector for a USB interface, FireWire, Thunderbolt, Ethernet, etc., to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 600 with another device, external component, or a network and receive stored instructions, data, tokens, etc. It will be appreciated that one or more buses may be used to interconnect the various components shown in FIG. 5.

It will be appreciated that additional components, not shown, may also be part of the system 600, and, in certain embodiments, fewer components than that shown in FIG. 5 may also be used in a data processing system 600. For example, in some embodiments the data processing system 600 may include or be coupled with an optical sensor for acquiring scan lines of a barcode.

Accordingly, the embodiments described above may be implemented in hardware, software, firmware, or any combination thereof. For example, they may be implemented in one or more computer programs executing on a programmable computer including a processor, a storage medium readable by the processor (including, for example, volatile and non-volatile memory and/or storage elements). According to some embodiments, the program code may be downloaded from a remote resource, for example, from a remote server accessed via the cloud over a wide area network such as the Internet.

Depending on the embodiment, the computer programs within the scope of the embodiments described herein may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Methods and associated acts in the various embodiments of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer, host systems or related accessories as well as other computers suitable for executing computer programs implementing the methods described herein.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for decoding a barcode included in at least one scan line into a string of decoded characters, the method comprising:
   for each of at least one barcode character set, establishing a validation threshold, respectively, the respective validation threshold determined based, at least in part, on a degree of difference found among a respective set of reference barcode symbols employed in representing a respective set of reference characters included in the barcode character set with which the respective validation threshold is associated;
   detecting, in the at least one scan line, barcode symbols ordered according to a reading direction;
   for each of the detected barcode symbols, decoding the detected barcode symbol into a decoded character for a corresponding character position in the string using a selected character set included in the at least one barcode character set, respectively, the decoding including:
      identifying a best-matching symbol for the detected barcode symbol among the respective set of reference barcode symbols of the selected character set; and
      validating, as the decoded character, a best-matched character that is represented by the best-matching symbol using the respective validation threshold established for the selected character set; and
   outputting the string of decoded characters.

2. The method of claim 1, further comprising:
   establishing a first validation threshold for a first barcode character set included in the at least one barcode character set, the first validation threshold determined based, at least in part, on a degree of difference found among a first plurality of reference barcode symbols employed in representing a first plurality of reference characters included in the first barcode character set; and
   establishing a second validation threshold for a second barcode character set included in the at least one barcode character set, the second validation threshold determined based, at least in part, on a degree of difference found among a second plurality of reference barcode symbols employed in representing a second plurality of reference characters included in the second barcode character set, the second plurality of reference barcode symbols being different than the first plurality of reference barcode symbols.

3. The method of claim 2, further comprising:
   decoding a first of the detected barcode symbols into a first decoded character for a first character position in the string using the first barcode character set, the first barcode character set associated with the first character position, the decoding including
   validating a first best-matched character for the first barcode character set using the first validation threshold established for the first barcode character set; and
   decoding a second of the detected barcode symbols into a second decoded character for a second character position in the string using the second barcode character set, the second barcode character set associated with the second character position, the decoding including validating a second best-matched character for the second barcode character set using the second validation threshold established for the second barcode character set.

4. The method of claim 1, further comprising:
   identifying the best-matching symbol for the detected barcode symbol among the respective set of reference barcode symbols by determining a difference between a measured width vector of the detected barcode symbol and a reference width vector of each reference barcode symbol of the respective set of reference barcode symbols,
   wherein the best-matching symbol has a minimum difference among the respective set of reference barcode symbols.

5. The method of claim 1, further comprising determining the respective validation threshold by:
   determining a value of a difference measure between each pair of reference barcode symbols included in the respective set of reference barcode symbols, respectively; and
   determining the validation threshold based on results of the act of determining the value of the difference measure.

6. The method of claim 5, further comprising determining the validation threshold based on a value that is the smallest among the respective values of the difference measure between each pair of reference barcode symbols.

7. The method of claim 6, further comprising determining the validation threshold as one half the value that is the smallest among the respective values of the difference measure between each pair of reference barcode symbols.

8. The method of claim 5, further comprising identifying the best-matching symbol by applying the difference measure between the detected barcode symbol and each one of the reference barcode symbols included in the respective set of reference barcode symbols.

9. The method of claim 1, further comprising providing a model decoded string that associates each character position in the string with a character set included in the at least one barcode character set and selecting the character set used for decoding for each character position in the string based on the model decoded string.

10. The method of claim 9, wherein the model decoded string is based on an expected format of the barcode according to a symbology of the barcode.

11. The method of claim 9, wherein the model decoded string is based on an expected format of the string of decoded characters provided by a user.

12. A non-transitory computer-readable medium comprising computer program instructions executable by at least one computer processor that when executed by the at least one computer processor perform a method for decoding a barcode included in at least one scan line into a string of decoded characters, the method comprising:
   for each of at least one barcode character set, establishing a validation threshold, respectively, the respective validation threshold determined based, at least in part, on a degree of difference found among a respective set of reference barcode symbols employed in representing a respective set of reference characters included in the barcode character set with which the respective validation threshold is associated;

detecting, in the at least one scan line, barcode symbols ordered according to a reading direction;

for each of the detected barcode symbols, decoding the detected barcode symbol into a decoded character for a corresponding character position in the string using a selected character set included in the at least one barcode character set, respectively, the decoding including:

identifying a best-matching symbol for the detected barcode symbol among the respective set of reference barcode symbols of the selected character set; and     validating, as the decoded character, a best-matched character that is represented by the best-matching symbol using the respective validation threshold established for the selected character set; and outputting the string of decoded characters.

13. The non-transitory computer-readable medium of claim 12, the method further comprising:

establishing a first validation threshold for a first barcode character set included in the at least one barcode character set, the first validation threshold determined based, at least in part, on a degree of difference found among a first plurality of reference barcode symbols employed in representing a first plurality of reference characters included in the first barcode character set; and establishing a second validation threshold for a second barcode character set included in the at least one barcode character set, the second validation threshold determined based, at least in part, on a degree of difference found among a second plurality of reference barcode symbols employed in representing a second plurality of reference characters included in the second barcode character set, the second plurality of reference barcode symbols being different than the first plurality of reference barcode symbols.

14. The non-transitory computer-readable medium of claim 13, the method further comprising:

decoding a first of the detected barcode symbols into a first decoded character for a first character position in the string using the first barcode character set, the first barcode character set associated with the first character position, the decoding including validating a first best-matched character for the first barcode character set using the first validation threshold established for the first barcode character set; and decoding a second of the detected barcode symbols into a second decoded character for a second character position in the string using the second barcode character set, the second barcode character set associated with the second character position, the decoding including validating a second best-matched character for the second barcode character set using the second validation threshold established for the second barcode character set.

15. The non-transitory computer-readable medium of claim 12, the method further comprising:

identifying the best-matching symbol for the detected barcode symbol among the respective set of reference barcode symbols by determining a difference between a measured width vector of the detected barcode symbol and a reference width vector of each reference barcode symbol of the respective set of reference barcode symbols, wherein the best-matching symbol has a minimum difference among the respective set of reference barcode symbols.

16. The non-transitory computer-readable medium of claim 12, the method further comprising determining the respective validation threshold by:

determining a value of a difference measure between each pair of reference barcode symbols included in the respective set of reference barcode symbols, respectively; and determining the validation threshold based on results of the act of determining the value of the difference measure.

17. The non-transitory computer-readable medium of claim 16, the method further comprising determining the validation threshold based on a value that is the smallest among the respective values of the difference measure between each pair of reference barcode symbols.

18. The non-transitory computer-readable medium of claim 17, the method further comprising determining the validation threshold as one half the value that is the smallest among the respective values of the difference measure between each pair of reference barcode symbols.

19. The non-transitory computer-readable medium of claim 16, the method further comprising identifying the best-matching symbol by applying the difference measure between the detected barcode symbol and each one of the reference barcode symbols included in the respective set of reference barcode symbols.

20. The non-transitory computer-readable medium of claim 12, the method further comprising providing a model decoded string that associates each character position in the string with a character set included in the at least one barcode character set and selecting the character set used for decoding for each character position in the string based on the model decoded string.

21. The non-transitory computer-readable medium of claim 20, wherein the model decoded string is based on an expected format of the barcode according to a symbology of the barcode.

22. The non-transitory computer-readable medium of claim 20, wherein the model decoded string is based on an expected format of the string of decoded characters provided by a user.

\* \* \* \* \*